May 15, 1956  G. C. SZIKLAI  2,745,316
HIGH EFFICIENCY POLARIZING LIGHT VALVE
Filed Dec. 23, 1952
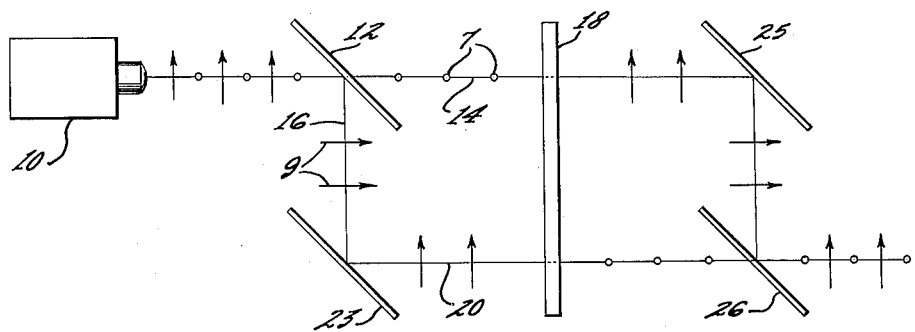
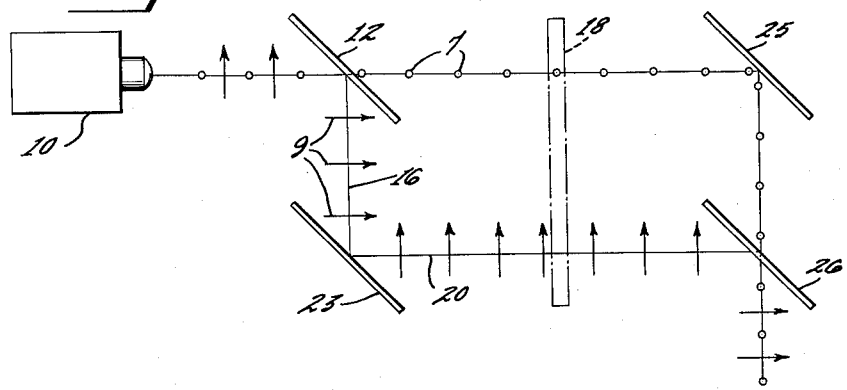
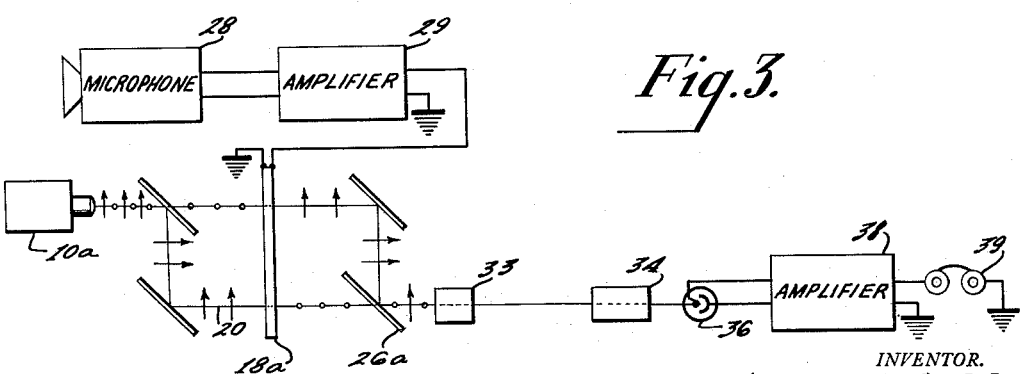
INVENTOR.
George C. Sziklai
BY Morris ...
ATTORNEY United States Patent Office 2,745,316
Patented May 15, 1956

2,745,316

HIGH EFFICIENCY POLARIZING LIGHT VALVE

George C. Sziklai, Princeton, N. J., assignor to Radio Corporation of America, a corporation of Delaware Application December 23, 1952, Serial No. 327,503

The terminal 15 years of the term of the patent to be granted has been disclaimed 3 Claims. (Cl. 88—61)

The present invention relates to light valves, and, more particularly, although not necessarily exclusively, to a novel high efficiency light valve which is capable of modulating light within a wide range of values by transmitting or rejecting a high percentage of the light, and which transmits light in different directions upon electrical or mechanical modulation.

Polarizing light valves of the prior art have been used to regulate light transmission for a number of purposes such as for the modulation of a motion picture sound track, light telephony, variable density neutral filters, and the like. However, all of the prior art arrangements just referred to wasted at least one half of the original light at their most transparent condition due to the loss in the polarizer which absorbed at least half of the light.

There is provided, in accordance with the present invention, a high efficiency polarizing light valve which transmits substantially all of the original light incident on the valve in a desired direction, but deflects the emerging light gradually or suddenly from one direction to another by means of mechanical or electrical instrumentalities. For example, in practicing the present invention, incident light is divided into two components by a polarizing beam-splitter. These components traverse separate paths and under one condition of modulation their plane of polarization is altered. The separate light paths are again joined through means which serves as an additional beam-splitter and as a consequence substantially all of the light emerges along a single path. In the arrangement just described, involving the invention by way of example, when the light in the separate paths does not have its plane of polarization altered then substantially the total light emerges along a different predetermined path.

The principal object of the present invention is to provide a novel high efficiency polarizing light valve which is capable of delivering up to substantially 100 per cent of the original incident light.

Another object of the present invention is to provide a novel high efficiency polarizing light valve from which incident light will emerge along either one of two predetermined paths depending upon the condition of modulation.

A further object of the present invention is to provide a novel polarizing light valve having an initial beam-splitter and polarizer and a final beam-splitter and polarizer and in which modulation is effected by selectively altering the plane of polarization of light traversing separate paths between the initial and final beam-splitter.

Other objects and advantages of the present invention will, of course, become apparent and immediately suggest themselves to those skilled in the art to which the invention is directed from a reading of the following specification in connection with the accompanying drawing in which:

Fig. 1 is a diagrammatic showing of a light valve embodying the present invention;

Fig. 2 is similar to Fig. 1 and shows the light valve of Fig. 1 under a different condition of modulation; and Fig. 3 shows schematically and by way of example a light valve embodying the present invention serving as a modulator in a light telephone system.

Referring for the present to Figs. 1 and 2 of the drawing, there is shown a light source 10 of suitable intensity. It will be understood by those skilled in the art that accompanying optical devices such as a reflector and lens (neither shown) may be provided to direct the incident light beam along the light path shown illustratively in the drawing. As indicated by the dots 7 and the short arrows 9, the light emitted by the source 10 is indicated as comprising light polarized in a horizontal plane and a vertical plane as well as all other planes of polarization. A polarizing beam-splitter 12 is positioned to receive light from the source 10 and to divide the incident light into two components, transmitting the horizontally polarized component indicated by the dots 7 along the path 14 and reflecting the vertically polarized component represented by the short arrows 9 along a path 16. The polarizing beam-splitter 12 may be similar to the element G shown in Patent No. 2,476,014, granted to E. H. Wright on January 12, 1949. It is, however, preferably of the type shown and described in an article by C. D. West and R. C. Jones published in The Journal of the Optical Society of America, vol. 41, pages 978–982, bearing the date of December 1951. The foregoing are cited by way of example and it will be understood that any suitable polarizing beam-splitter may be employed. A half wave quartz plate 18 is shown positioned in the light path 14 as well as the light path 20 following the vertically polarized light of the path 16 after reflection by a suitably positioned mirror 23. The plate 18 is or may be similar to that described in Patent No. 2,576,652, granted on November 27, 1951, to Sziklai et al. Electro-optical devices such as a Kerr cell or optical crystals may be used. An ammonium dihydrogen phosphate crystal known as a "PN" crystal may be used with advantage since such a crystal provides a quarter wave retardation with 2,500 volts applied along the optical axis.

The beam or light in the path 14 which is polarized horizontally passes through the half wave plate 18 which turns the polarization plane by 90 degrees. Thus the beam 14 is now vertically polarized as indicated by the short arrows 9. After reflection by a suitably placed mirror 25, the now vertically polarized beam 14 is again reflected by a second polarizing beam-splitter 26. The polarizing beam-splitter 26 is or may be similar to the previously described polarized beam splitter 12. The vertically polarized beam in the light path 20, reflected by the mirror 23, passes through the half wave plate 18 so that it is rotated to horizontal polarization as indicated by the dots 7. This beam is then transmitted by the beam-splitter 26 and recombines with the other component which was reflected and thus essentially the full original light intensity is transmitted in a direction which is parallel with the original beam from the light source 10 in the illustrative arrangement of Fig. 1.

Referring to Fig. 2 of the drawing, it is assumed that the half wave plate 18 has been removed from the position illustrated by Fig. 1 or that the characteristics of the half wave plate, now indicated by dotted lines, are changed so that the plane of polarization is not rotated. The light beam in the path 14 continues to be horizontally polarized and is passed by the polarizing beam-splitter 26 after reflection by the mirror 25. The vertically polarized beam, originally in the light path 16, has its vertical polarization maintained and is reflected by the polarizing beam-splitter 26. Thus light from the source 10 or the original incident beam emerges with substantially full intensity and with 90 degrees of deflection as shown. Accordingly, by changing the retardation or rotation of the plate 18 the incident light may be completely blocked or gradually controlled. The exercise of control will cause diminution of light emerging in one direction and a consequent increase of light in the other direction. Stated in another way, the light may be shut off or gradually controlled in two positions in one spot in the negative sense of the other. Control may be effected by mechanically moving the half wave plate 18 in and out of the light paths 14 and 20 for instance by means of a loudspeaker mechanism if the device is to be used for light telephony, motion picture sound recording, and so forth as mentioned above.

Fig. 3 of the drawing shows a polarizing light valve embodying principles of the present invention used in a telephone system in which a modulated beam of light transmits intelligence between two spaced points. A source of signals, such as a microphone 28, of any known kind is coupled to a signal amplifier 29. The output of the latter is coupled or connected to the half wave plate 18a which may be a "PN" crystal or any other of the previously mentioned electro-optical devices. The light valve from the light source 10a to the final polarizing beam splitter 26a is of the kind already fully described in the foregoing. The light beam from the polarizing beam splitter 26a is directed by a suitable lens system 33 and telescope 34 onto a known type of phototube 36. The output of the latter is received and amplified by an amplifier 38 and supplied to a signal actuated device such as a telephone receiver or pair of telephone receivers 39. In operation of the arrangement of Fig. 3 the light output beyond the final polarizing beam-splitter 26a will vary between the conditions shown in Figs. 1 and 2 depending upon the modulation imposed by the microphone 28.

What is claimed is:

1. In combination, a light source, means for reflecting a portion of light from said light source and for transmitting another portion of said light having a plane of polarization differing from the plane of polarization of said first portion of light, a source of electrical signals, means connected to said source of electrical signals and responsive thereto for variably rotating the plane of polarization of both of said portions, means for directing both of said portions thereafter upon means for reflecting one of said portions along a given path and for transmitting the other of said portions having a plane of polarization differing from the last-named reflected portion along said path, and light sensitive means positioned to receive light directed along said path whereby variable operation of said means for rotating the plane of polarization causes variations in the direction of said path.

2. A light valve for modulating light projected from a light source comprising a polarizing beam splitter positioned to receive light from said source, a reflecting element positioned to receive and reflect light reflected by said beam splitter, a half wave plate positioned to receive light reflected by said reflecting element and light transmitted by said polarizing beam splitter, a second reflecting element positioned to receive light transmitted by said polarizing beam splitter and said half wave plate, means connected to said half wave plate for applying a source of electrical signals thereacross whereby to modulate light passing therethrough in response to said signals, and a second polarizing beam splitter positioned to receive light reflected from said second reflecting element and light reflected by said first reflecting element.

3. A light valve for modulating light projected from a light source comprising a polarizing beam splitter positioned to receive light from said source, a reflecting element positioned to receive and reflect light reflected by said beam splitter, a half wave plate positioned to receive light reflected by said reflecting element and light transmitted by said polarizing beam splitter, means to connect signal responsive means to said half wave plate to vary the light polarizing effect of said half wave plate, a second reflecting element positioned to receive light transmitted by said polarizing beam splitter and said half wave plate, and a second polarizing beam splitter positioned to receive light reflected from said second reflecting element and light reflected by said first reflecting element.

References Cited in the file of this patent
UNITED STATES PATENTS

| | | |
|---|---|---|
| 1,963,127 | Gardner | June 19, 1934 |
| 2,118,160 | Cawley | May 24, 1938 |
| 2,685,228 | Kavanagh | Aug. 3, 1954 |

OTHER REFERENCES

"Polarization in Optical Instruments," Journal of the Optical Society of America, vol. 41, December 1951, pages 976–981.